United States Patent [19]

Boram et al.

[11] Patent Number: 5,572,814
[45] Date of Patent: Nov. 12, 1996

[54] HAND-HELD MICROFILM READERS

[75] Inventors: Frank Boram, 17 Kivernell Road, Milford on Sea, Lymington, Hampshire SO41 0PP; John M. Boram, Marden Lodge, Rhinefield Road, Brockenhurst, Hampshire SO42 7SQ, both of United Kingdom

[73] Assignees: Projectron Ltd.; Frank Boram; John M. Boram, all of United Kingdom

[21] Appl. No.: 333,765

[22] Filed: Nov. 3, 1994

[30] Foreign Application Priority Data

Dec. 24, 1993 [GB] United Kingdom ............... 9326436
Sep. 28, 1994 [GB] United Kingdom ............... 9419670

[51] Int. Cl.⁶ ............................. G02B 27/02; F21V 33/00
[52] U.S. Cl. ............................. 40/362; 40/367; 362/253; 359/798; 359/803
[58] Field of Search ............................. 40/361, 362, 366, 40/367, 159.2; 362/253, 190; 352/129; 353/25, 27 R; 359/798–810

[56] References Cited

U.S. PATENT DOCUMENTS

| D. 168,546 | 1/1953 | Igler et al. .................. 359/805 X |
| 2,617,218 | 11/1952 | Antos .......................... 359/804 X |
| 2,720,045 | 10/1955 | Miller ............................... 40/362 |
| 2,808,761 | 10/1957 | De Grave, Jr. .............. 359/798 X |
| 3,628,871 | 12/1971 | Himmeistrup .............. 359/802 X |
| 3,957,358 | 5/1976 | Holliday . |
| 3,967,401 | 7/1976 | Numbers ...................... 40/362 |
| 4,012,110 | 3/1977 | Schael et al. ................... 359/375 |
| 4,089,593 | 5/1978 | Bernard et al. . |
| 4,100,591 | 7/1978 | Schael . |
| 4,149,776 | 4/1979 | Everett, Jr. . |
| 4,234,244 | 11/1980 | Klein . |
| 4,250,644 | 2/1981 | Jantzen ...................... 40/362 X |
| 4,257,180 | 3/1981 | Carpenter, Jr. ............... 40/362 |
| 4,372,068 | 2/1983 | Knapp et al. ................ 40/362 X |
| 4,532,728 | 8/1985 | Posso ............................. 40/367 |

FOREIGN PATENT DOCUMENTS

| 0143355A2 | 6/1985 | European Pat. Off. . |
| 1338638 | 11/1973 | United Kingdom . |
| 1521958 | 8/1978 | United Kingdom . |
| 1555533 | 11/1979 | United Kingdom . |

*Primary Examiner*—Jose V. Chen
*Assistant Examiner*—James O. Hansen
*Attorney, Agent, or Firm*—Fields & Johnson, P.C.

[57] ABSTRACT

A hand-held microfilm reader comprises an elongate body formed by two parts connected together at one end and separated at the other ends to form a slot. A microfilm sheet can be inserted in the slot with a translucent screen being provided to one side of the slot and a magnifying system to the other side of the slot. An electric light bulb is provided behind the translucent screen to illuminate the screen and the sheet and a clamping device is provided for releasably clamping a sheet against the translucent screen when a required portion of the sheet is in the field of view of the magnifying device.

A translucent cover may be provided in the part carrying the screen to allow ambient light to the screen to illuminate a microfilm should the electric light system fail.

22 Claims, 3 Drawing Sheets

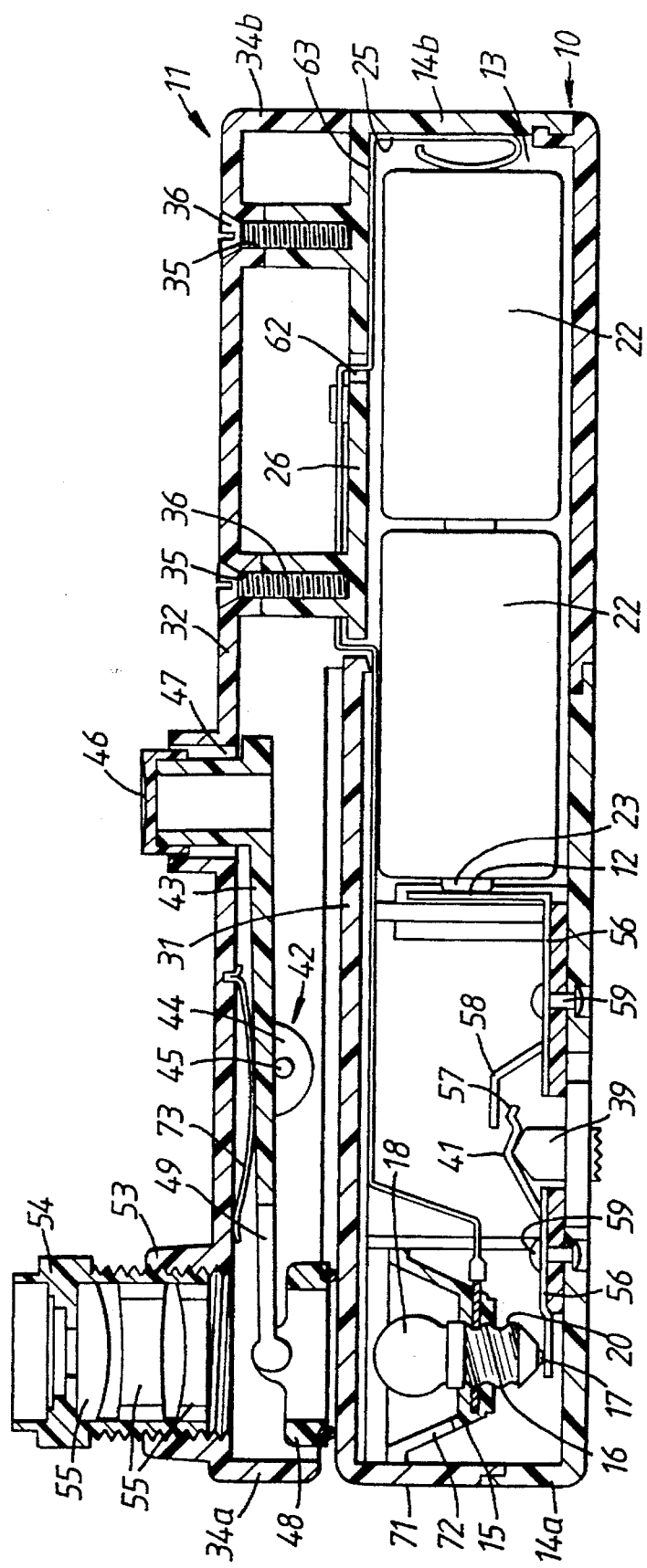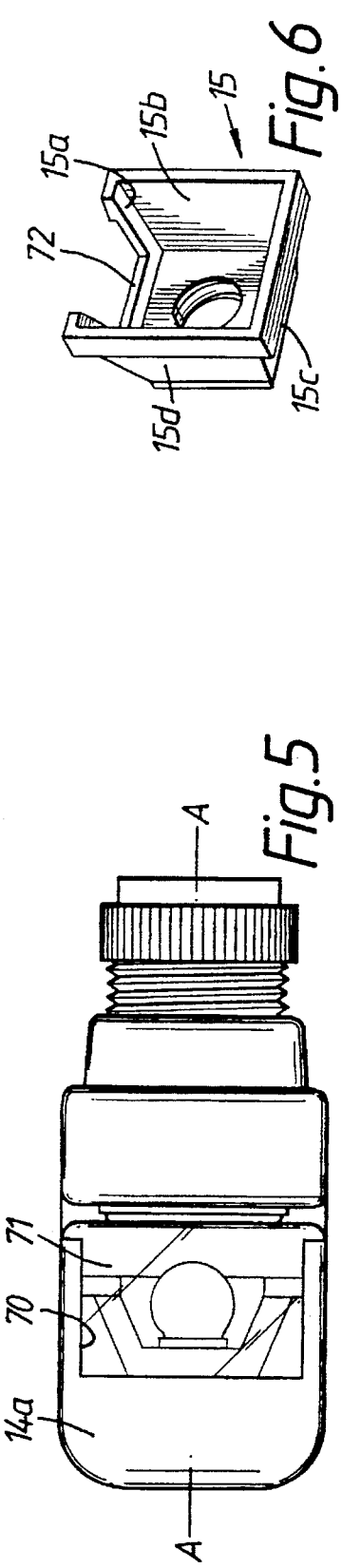

5,572,814

HAND-HELD MICROFILM READERS

BACKGROUND TO THE INVENTION

1. Field of the Invention

The invention relates to hand-held microfilm readers.

The storage of information on microfilm is widespread. Any information normally presented on paper can be presented on microfilm with the microfilm providing, volume for volume, enormously increased storage of information as compared with paper.

2. Brief Review of the Prior Art

The reading of information from microfilm requires the use of a microfilm reader. In general, such a reader comprises a platen including two sheets of glass between which the microfilm is held and which is mounted on a carriage for movement over a light source with an image of the information on the microfilm being presented on a screen.

Such readers cannot, however, conveniently be used in certain situations. For example, technicians dealing with broken down or malfunctioning equipment on-site very often carry information about that equipment on microfilm sheets. In order to access the information, a reader is required. There can also be occasions when it is not convenient to view a sheet using a reader of the kind described above—for example when a sheet of microfilm needs to be viewed quickly to determine whether the information it contains is relevant.

SUMMARY OF THE INVENTION

According to the invention, there is provided a hand-held microfilm reader comprising an elongate body providing a U-section slot for receiving a sheet of microfilm, the first part of the body being to one side of the slot and the second part of the body being to the other side of the slot, said first body part being provided with a translucent screen and a light source behind the screen and the second body part being provided with magnifying means for viewing a portion of a microfilm on the translucent screen and illuminated at the light source.

The reader can thus be held in one hand and the sheet of microfilm in the other hand with the sheet being manoeuvred relative to the slot until the required portion is in the field of view of the magnifying means. The information on the required portion can then be read through the magnifying means.

The following is a more detailed description of some embodiments of the invention, by way of example, reference being made to the accompanying drawings in which:—

BRIEF DESCRIPTION OF THE DRAWINGS

FIG. 4 is a similar view to FIG. 3 but showing a second form of hand-held microfilm reader in cross-section on the line A—A of FIG. 5, FIG. 5 is an end elevation of the reader of FIG. 4, and FIG. 6 is a perspective view of a reflector of the reader of FIGS. 4 and 5.

DESCRIPTION OF THE PREFERRED EMBODIMENTS

Figure 1:
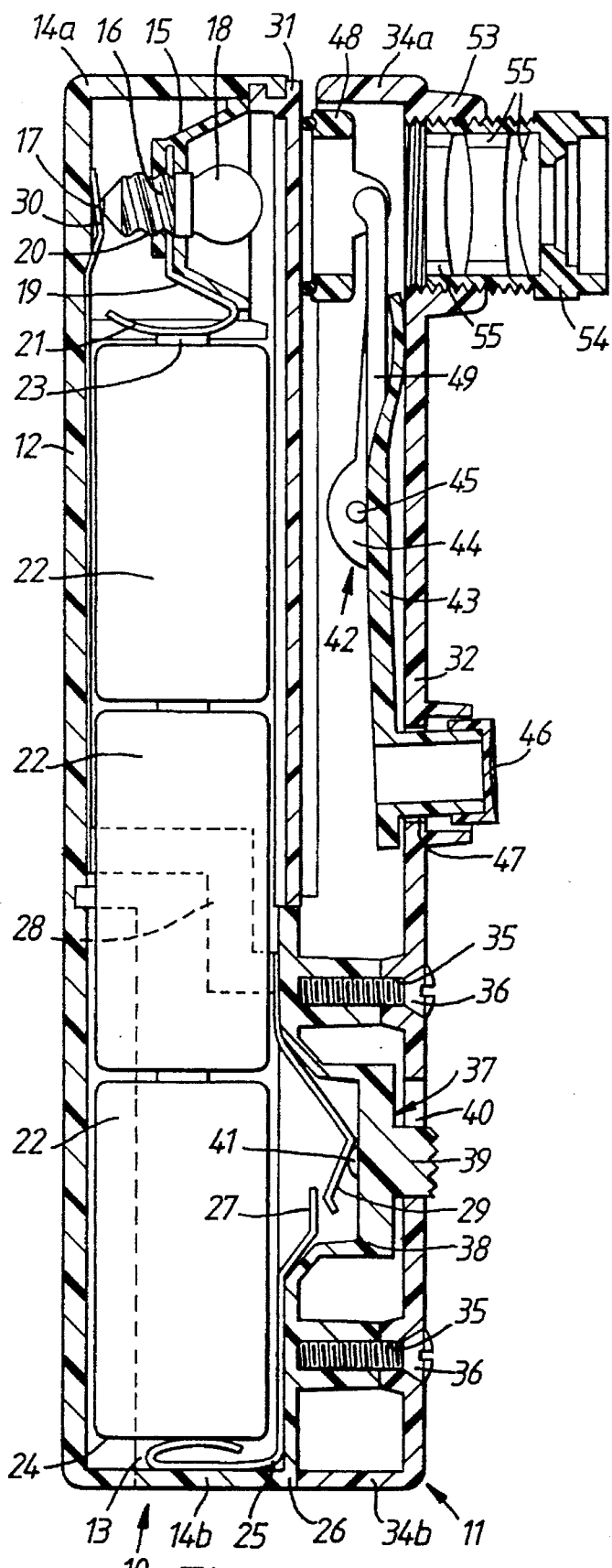
FIG. 1 is a longitudinal cross section through a first form of hand-held microfilm reader.

Referring first to FIG. 1, the reader comprises a body having the shape of a generally elongate tube. The body is formed by first and second moulded parts 10,11.

The first part 10 is in the form of a rectangular section box open along part of one side and includes a rectangular elongate outer wall 12, two upstanding parallel side walls, one of which is shown at 13, and end walls 14a,14b extending upwardly from respective ends of the outer wall 12 and between respective ends of the side walls 13.

A light bulb holder and reflector 15 is adjacent to one end wall 14a, is held between the walls 13 and carries a light bulb 16 so that a contact end 17 of the light bulb is adjacent the inner surface of the outer wall 12 and the filament end 18 of the light bulb 16 is adjacent the open side of the first part 10.

A first conductive strip 19 extends from the holder 15, where it contacts a conductive outer surface 20 of the light bulb 16, and forms a contact section 21 lying in a plane generally parallel to the end walls 14. Three dry cell batteries 22 are laid in series end-to-end in the first part 10 and a terminal 23 for one battery at one end of the series contacts the contact section 21 of the conductor 19. A terminal provided by an end surface 24 of the battery at the opposite end of the series contacts a second conductive strip 25 carried by the other end wall 14b. A short portion of front wall 26 is provided between the side walls 13 at this end of the first part 10. The second conductive strip 25 extends along the undersurface of this front wall and projects through an aperture in the front wall to form a first switch portion 27. A third conductive strip 28 has a second switch portion 29 adjacent the first switch portion 27 of the second conductive strip 25 and then extends down the inner surface of one side wall 13 and along the inner surface of the outer wall 12 to a contact 30 engaging the contact end 17 of the light bulb 16.

The part of the outer wall 12 and the side wall 13 is formed as a removable cover for replacement of the batteries 22.

A rectangular translucent screen 31 is carried by the first part 10. The translucent screen 31 is generally rectangular and is carried by the end wall 14a and the side walls 13 of the moulding to cover the open side of the part 10. As seen in FIG. 1, the translucent screen 31 extends for the full depth of the slot (about halfway along the part 10) and is removable for access to the bulb 16.

A portion of the translucent screen 31 covering the light bulb 16 is provided with an appropriate graticule line or lines (not shown).

The second part 11 (referring now also to FIG. 2) has an outer wall 32, two upstanding side walls 33 and two end walls 34a,34b projecting from respective opposite ends of the outer wall 32 and extending between the side walls 33. The part 11 is provided, towards one end wall 34b, with two screw holes 35 through which extend respective screws 36 engaging with respective parts on the front wall 26 of the first part 10 to hold the parts 10,11 together.

A switch 37 is provided between the screw holes 35 for co-operation with the first and second switch parts 27 and 29. The switch 37 comprises a mounting 38 formed as part of the moulding of part 10 and carrying a switch member 39 that projects through an aperture 40 in the outer wall 32. The switch member 39 includes a projection 41 that engages the second switch portion 29 so that, as the switch member 39 is moved along the mounting 38 from the position shown in FIG. 1 towards the opposite end of the aperture 40, the projection 41 depresses the second switch part 29 to bring it into electrical contact with the first switch part 27 and so complete the circuit illuminating the light bulb 16. Reverse movement switches off the light bulb 16.

Towards the other end of the second part 11, the side walls 33 and the end wall 34a are cut away. This forms a U-section slot between the first and second parts 10,11 which extends from the end of the reader at the end walls 14a,34a and through the reader from one pair of side walls 13,33 to the other pair of side walls 13,33. This slot is sized so that its depth is equal to the depth of the area of a conventional sheet of microfilm containing information to be viewed. This allows a conventional sheet of microfilm to be manoeuvred in the slot so that all parts of the film can be aligned with the light bulb 16.

A clamping device 42 is carried by part 11. The device 42 comprises a lever arm 43, seen also in FIG. 2. The lever arm 43 is provided with spaced ears 44 through which extends a rod 45 whose ends are carried by respective ones of the side walls 33. Thus the lever arm is mounted for pivotal movement about an axis parallel to the translucent screen 31. One end of the lever arm 43 carries a button 46 which projects through a hole 47 in the outer wall 32 for manual operation. The other end of the lever arm 43 carries an annular clamping member 48. This end of the lever arm 43 is bifurcated to provide two arms 49 with an end of each arm 49 being pivotally connected to the clamping member 48 at respective diametrically opposed sides of the clamping member 48. Thus the clamping member 48 is carried on the lever arm 43 for pivotal movement about an axis parallel to the pivot axis of the lever arm 43. The clamping device 48 has a clamping surface 50 provided resilient O-ring 51 for a purpose to be described below.

This side of the lever arm 43 is formed from a resilient plastics material and is also provided with a leaf spring portion 52 which is formed integrally with the rest of the lever arm 43 and which bears against the inner surface of the outer wall 32 and urges the lever arm 43 into the position shown in FIG. 1 in which the clamping member 48 is urged downwardly into contact with the translucent screen 31 and the button 46 projects a maximum amount from the hole 47.

The annular clamping member 48 is, as seen in the Figures, aligned with the light bulb 16 so that the clamping member 48 defines an annular field of view.

The second moulding 11 also carries a magnifying system screwed into a mounting 53 adjacent the end of the slot and extending in a direction normal to the plane of the translucent screen 31 and aligned with the annular clamping device 48 and the light bulb 16. The magnifying system comprises an eyepiece 54 carrying lenses 55, adjustable for focussing which gives sufficient magnification for a normally sighted person to read the information on a microfilm sheet. One of the lenses only may be adjustable relative to the others to provide focussing.

The reader is used in the following way.

The reader is gripped in one hand around the end remote from the slot. The light bulb 16 is illuminated by use of the switch member 39 and a sheet of microfilm held in the other hand. The button 46 is depressed to raise the clamping member 48 away from contact with the translucent sheet 31 and against the force of the spring 52. The sheet is then inserted in the slot and manoeuvred until the portion of the sheet to be read comes within the field of view. The length of the translucent sheet 31 provides a smooth surface in contact with the microfilm to prevent scratching of the film. The button 46 is then released and the spring 52 forces the clamping member 48 towards the translucent screen. This brings the O-ring 51 into contact with the sheet and presses the sheet against the translucent screen 31 with the pivotal connection between the lever arm 43 and the clamping member 48 allowing the clamping member 48 to align itself with the O-ring 51 lying in a plane parallel to the plane of the translucent sheet 31. The sheet is thus held with the portion of the sheet it is desired to read within the field of view and with the sheet a predetermined distance from the lenses 55. Thus the sheet can be viewed in proper focus, using the graticule lines for orientation as necessary. The reader can be held in one hand to free the other for tasks such as the writing of information read from the film.

By pressing the button 46 once again, other areas of the sheet can readily be manoeuvred into the field of view and clamped as described above. This also allows the sheet to be released and removed and another sheet inserted. The screeen 31 provides a smooth surface that allows the sheet to be moved over the screen 31 without scratching. This is helped by the fact that the screen 31 extends the full depth of the slot.

It will be appreciated that the reader described above with reference to the drawings can be modified in a number of ways. The bulb need not be placed under the translucent screen; it could be positioned remotely from the screen and the light conducted to an appropriate position by, for example, optical fibres or a mirror system. The dimensions of the reader can be altered to accommodate any size of microfilm sheet.

Where a clamping device is provided, the light source may be omitted and ambient light used to illuminate the microfilm. In this case, the translucent sheet may be illuminated by any suitable light collecting means. For example, ambient light may be directed towards the sheet by a mirror.

The clamping device need not be as described. The lever arm could be a different class of lever or could be omitted altogether; the clamping device being guided in grooves in a rectilinear movement. The clamping member 48 need not be annular, it could be square or any other convenient shape. The spring 52 need not be formed integrally with the lever arm, it could be formed separately and could act on any part of the lever.

The reader is inexpensive to produce.

In addition, three batteries need not be provided; more or less batteries may be used as required. The switch need not be positioned as shown in FIG. 1, it may be positioned elsewhere. An example of a reader incorporating such modifications is shown in FIG. 3. This reader has many parts in common with the reader of FIGS. 1 and 2 and these parts and their operation will not be described in detail and will be given the same reference numerals in the Figures.

In FIG. 3, the reader has only two batteries 22. In addition, the switch member 39 is located not on the second part 11 but on the outer wall 12 of the first part 10. In the reader of FIG. 3, conductive strips are provided which are arranged differently from the conductive strips 19, 25 and 27 of the reader of FIGS. 1 and 2.

Figure 2:
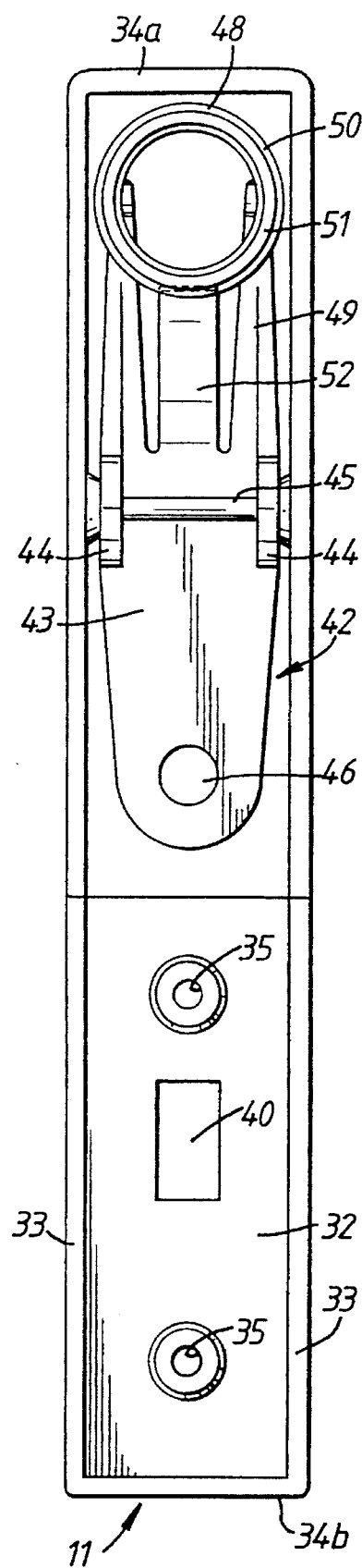
FIG. 2 is a plan view of an inner face of a moulding forming part of the reader of FIG. 1 and carrying a clamping device.
Figure 3:
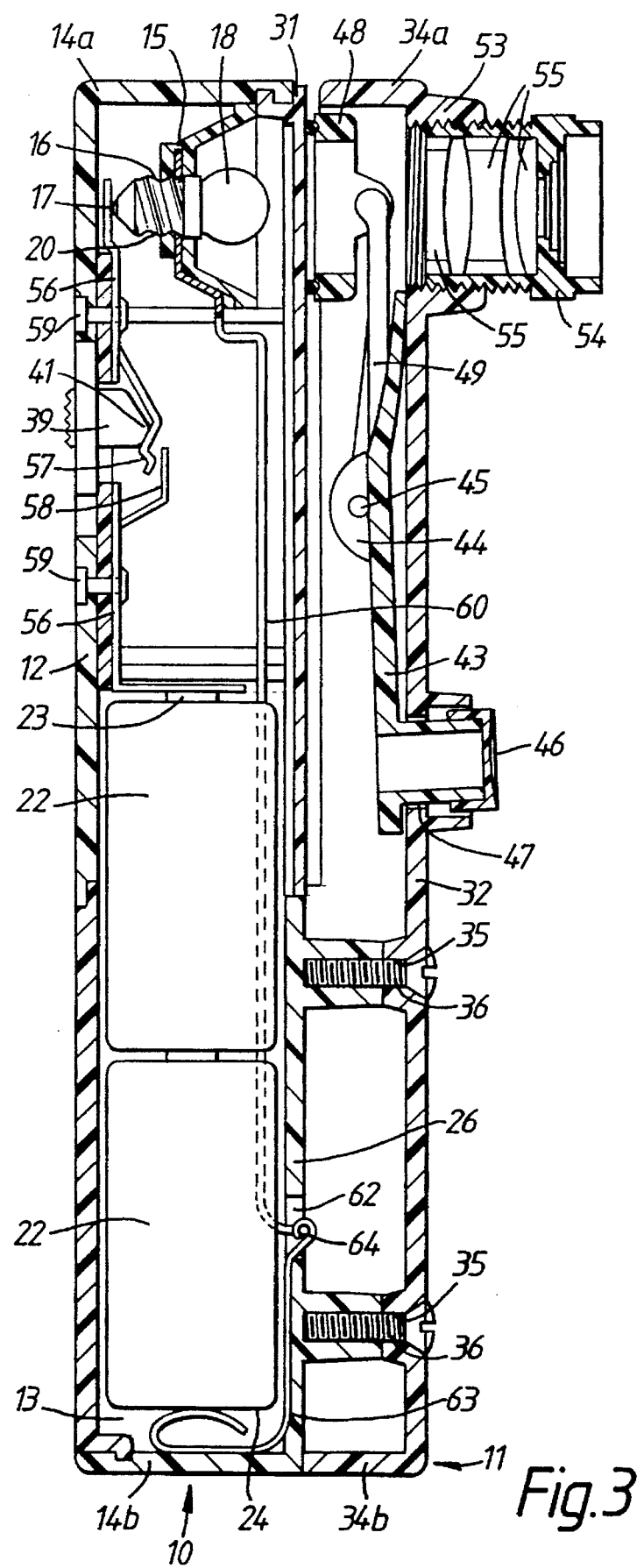
FIG. 3 is a similar view to FIG. 1 but showing a modified form of the reader of FIG. 1 with two batteries and a switch positioned on the part of the reader holding the batteries.

Considering these differences in more detail, as compared with the reader of FIGS. 1 and 2, the battery 22 adjacent the light bulb 16 is removed, leaving only two batteries 22 connected end to end in series and extending from the end wall 14b. The switch member 39 is mounted on the outer wall 12 of the first part 10 in the gap between the end of the batteries 22 and the light bulb 16. This means that the mounting 38 is omitted and the front wall portion 26 is substantially uninterrupted.

A first conductive strip 56 extends between the contact end 17 of the light bulb 16 and the terminal 23 of the battery 22 adjacent the light bulb 16. This conductive strip 56 is interrupted at the switch member 39 to form two switch portions 57,58 whose ends overlap and which are normally spaced apart, as seen in FIG. 3. As also seen in this Figure, one of the switch portions 57 engages with the projection 41 on the switch member 39 so that, as the switch member is moved from the "off" position shown in FIG. 3 to an "on" position by sliding the switch member 39 along the outer wall 12, the switch portion 57 is brought into electrical contact with the switch portion 58.

The conductive strip 56 is riveted to the outer wall 12 to either side of the switch member 39 by rivets 59.

An insulated wire 60 extends between the conductive outer surface 20 of the light bulb 16 and an aperture 62 in the front wall portion. A second conductive strip 63 forms a terminal at the end of the battery 22 adjacent the end wall 14b and a short looped portion 64 of the second conductive strip 63 projects into the aperture 62 where it connects with an end of the insulated wire 60.

In use, the reader of FIG. 3 operates in the same way as the reader of FIGS. 1 and 2 and as described above with reference to those Figures. Since the reader of FIG. 3 includes only two batteries, it is lighter in weight than the reader of FIGS. 1 and 2. Further, for some uses, the switch member 39 is more conveniently placed in the reader of FIG. 3 than in the readers of FIGS. 1 and 2.

Referring next to FIGS. 4, 5 and 6, the second form of hand-held film reader shown in those figures has many parts in common with the reader of FIG. 3. Those common parts will not be described in detail and are given the same reference numerals in FIGS. 4 to 6 as in FIG. 3.

The principle difference between the reader of FIG. 3 and the reader of FIGS. 4 to 6 is that the latter has a portion of the end wall 14a cut away (see FIG. 5) to form a U-shaped notch 70. The screen 31 is formed with an extension 71 at one end which lies in a plane at right angles to the plane of the screen 31 and which extends into the notch 70 (see FIGS. 4 and 5). Thus a portion of the end wall 14a is translucent. The reflector 15 is, as seen in FIG. 6, formed with four planar diverging walls 15a,15b,15c,15d and one of the walls 15a—the wall adjacent the screen extension 71—is provided a cut-out 72.

The effect of this is to form a light path which allows ambient light to pass through the translucent screen extension 71 and the cut-out 72 to the screen 31. This allows microfilm held on the screen 31 as described above with reference to the drawings to be viewed using ambient light if the batteries fail or are removed.

A further difference is that the clamping device 42 is no longer urged downwardly by a leaf spring portion 52 formed integrally with the device. Rather, the portion 52 is omitted and a metal leaf spring 73 is provided between the outer wall 32 and the device 42.

What we claim is:

1. A hand-held microfilm reader comprising:

an elongate body providing a U-section slot, having a first and second side, for receiving a sheet of microfilm, a first body portion located to said first side of said slot and a second body portion located to said second side of the slot, said first body portion being provided with a zone for receiving light;

said second body portion being provided with a magnifying system for viewing a portion of a sheet of microfilm on the light receiving zone;

a clamping device on said body movable between a first position spaced from said first body portion and a second clamping position against said first body portion to releasably clamp a sheet of microfilm on said light receiving zone in a required position relative to the magnifying system; and a moving device provided on said clamping device for selectively moving said clamping device from said first position to allow positioning of the sheet of microfilm and said second clamping position to hold the sheet of microfilm in a selected position.

2. A hand-held microfilm reader, according to claim 1, wherein:

the body is formed by two side-by-side parts, each having a first end and a second end, said parts being connected at said respective first ends but being unconnected at said second ends opposite said first ends to form said slot so that the sheet of microfilm can be manually maneuvered in said slot until a required portion of the sheet is aligned with said magnifying system.

3. A hand-held microfilm reader, according to claim 1, wherein said clamping device further comprises:

a pivoted lever arm having means for releasably pressing a sheet of microfilm against a translucent sheet on said first body portion, the lever arm being pivotable into said second clamping position in which said pressing means presses a sheet of microfilm against said translucent sheet.

4. A hand-held microfilm reader; according to claim 3, wherein:

said lever arm has a spring bias element for moving it into said second clamping position in which said pressing means releasably presses a sheet of microfilm against said translucent sheet.

5. A hand-held microfilm reader, according to claim 3, wherein:

said lever arm has a first and second end and is centrally pivoted to one side of said first and second sides of said slot, said pressing means being pivoted at said first end of said lever arm, said second end of said lever arm being manually operable.

6. A hand-held microfilm reader, according to claim 5, wherein:

said lever arm is spring biased by a spring bias element into a position in which said pressing means releasably presses a sheet of microfilm against said translucent sheet and is mounted on said second body portion; and said spring bias element includes a leaf spring acting between said lever arm and said second body portion.

7. A hand-held microfilm reader, according to claim 6, wherein:

said moving device comprising a button projecting from said second end of said lever arm so that operation of said button pivots said lever against said spring bias to release a sheet of microfilm.

8. A hand-held microfilm reader, according to claim 5, wherein:

said lever arm is spring biased by a spring bias element into a position in which said pressing means press a sheet of microfilm against said translucent base and is mounted on said second body portion, said spring bias element including a leaf spring formed integrally with said lever arm.

9. A hand-held microfilm reader, according to claim 3, wherein:

said lever arm carries a clamping member having a surface for engaging the sheet of microfilm to hold it against said translucent sheet, said clamping member having an aperture through which a desired portion of the microfilm is viewable through said magnifying system.

10. A hand-held microfilm reader, according to claim 9, wherein:

said clamping member is annular and has a generally circular opening for viewing and said surface for engaging a sheet of microfilm is annular.

11. A hand-held microfilm reader, according to claim 9, wherein:

said clamping member has a resilient strip carried on said annular surface for engagement with a sheet of microfilm.

12. A hand-held microfilm reader, according to claim 11, wherein:

said annular surface has a groove; and said resilient strip is provided by a resilient O-ring carried in said groove.

13. A hand-held microfilm reader, according to claim 9, wherein:

said clamping member is pivotally mounted on said lever arm to allow said clamping member to swivel to a position in which said clamping member surface is parallel to said translucent sheet.

14. A hand-held microfilm reader, according to claim 3, wherein said magnifying system comprises:

at least one optical lens having an optical axis normal to the plane of said translucent sheet.

15. A hand-held microfilm reader, according to claim 3, wherein:

said first body portion has a light path for allowing the passage of ambient light to said translucent sheet.

16. A hand-held microfilm reader, according to claim 15, wherein:

said light path includes a portion of said first body portion formed from a translucent material.

17. A hand-held microfilm reader, according to claim 15, wherein:

an electric bulb holder is mounted in said first body portion;

an electric bulb is mounted in said holder interposed in said light path, said holder being cut away to allow the passage of ambient light to said translucent sheet;

a battery mounted in said first body portion is electrically connected to said electric bulb; and a switch is electrically connected between said battery and said electric bulb to control operation of said electric bulb.

18. A hand-held microfilm reader, according to claim 1, wherein:

said light receiving zone includes a translucent sheet on said first body portion; and a light source in said first body portion behind said translucent sheet.

19. A hand-held microfilm reader, according to claim 18, wherein said light source comprises:

an electric bulb;

at least one battery mounted in said elongate body and electrically connected to said electric bulb; and a switch electrically connected between said electric bulb and said at least one battery to control power to said electric bulb.

20. A hand-held microfilm reader, according to claim 19, wherein:

said at least one lens is manually focusable.

21. A hand-held microfilm reader, according to claim 1, wherein said translucent sheet includes:

at least one graticule lines.

22. A hand-held microfilm reader, according to claim 1, wherein:

said elongate body has the shape of a generally elongate rectangular section tube.

* * * * *